US008479443B2

(12) United States Patent
Buist

(10) Patent No.: US 8,479,443 B2
(45) Date of Patent: Jul. 9, 2013

(54) GREEN ROOF SYSTEM WITH BIODEGRADABLE VEGETATION TRAY

(75) Inventor: Richard J. Buist, Burlington (CA)

(73) Assignee: Bioroof Systems Inc., Burlington, Ontario (CA)

( * ) Notice: Subject to any disclaimer, the term of this patent is extended or adjusted under 35 U.S.C. 154(b) by 372 days.

(21) Appl. No.: 12/988,853

(22) PCT Filed: Apr. 28, 2009

(86) PCT No.: PCT/CA2009/000564
§ 371 (c)(1), (2), (4) Date: Oct. 21, 2010

(87) PCT Pub. No.: WO2009/132439
PCT Pub. Date: Nov. 5, 2009

(65) Prior Publication Data

US 2011/0030274 A1 Feb. 10, 2011

Related U.S. Application Data

(60) Provisional application No. 61/048,674, filed on Apr. 29, 2008.

(51) Int. Cl.
*A01G 9/02* (2006.01)

(52) U.S. Cl.
USPC .......... 47/65.9

(58) Field of Classification Search
USPC .......... 47/1.01 F, 65.9
See application file for complete search history.

(56) References Cited

U.S. PATENT DOCUMENTS 3,919,163 A 11/1975 Clendinning et al.
4,043,077 A 8/1977 Stonehocker
5,315,786 A 5/1994 Smith et al.
5,946,854 A 9/1999 Guillemain et al.
6,606,823 B1 8/2003 McDonough et al.
6,732,666 B2 5/2004 Layt
6,862,842 B2 3/2005 Mischo
7,334,376 B1 2/2008 Behrens
7,392,616 B1 7/2008 Bagby
7,596,906 B2 * 10/2009 Gold .......... 47/65.9
7,726,071 B2 * 6/2010 Carpenter .......... 47/65.9
7,958,669 B2 * 6/2011 Casimaty et al. .......... 47/1.01 F (Continued)

OTHER PUBLICATIONS

Live Roof Brochure—Prevegetated Modular Green Roof System, Feb. 2008.

*Primary Examiner* — Frank T Palo
(74) *Attorney, Agent, or Firm* — Bereskin & Parr LLP/S.E.N.C.L.R., s.r.l.

(57) ABSTRACT

A green roof module for covering a portion of a roofing surface with vegetation, includes a tray for containing a growing medium and vegetation, a permeable membrane, and a drainage board The tray has a biodegradable bottom and a plurality of upwardly extending biodegradable walls about the perimeter of the biodegradable bottom The biodegradable bottom is configured so that water received within the tray can pass therethrough The permeable membrane is provided below the biodegradable bottom, and is sized and shaped so as to span the biodegradable bottom and configured to allow water to pass therethrough while inhibiting the growing medium from passing therethrough The drainage board is provided below the permeable membrane opposite the biodegradable bottom, and has an upper surface for supporting the biodegradable bottom and being surrounded by a plurality of edges The drainage board is configured so that at least some of the water passing through the permeable membrane and received on the drainage board will be drained away from the tray.

50 Claims, 12 Drawing Sheets

60 72 68 70 67 72 62 72 72 63 64 65 66

U.S. PATENT DOCUMENTS

2004/0074164 A1 4/2004 Behrens
2005/0044791 A1 3/2005 Morandini et al.
2005/0102921 A1 5/2005 Mischo
2005/0120656 A1 6/2005 Luckett
2007/0079547 A1 4/2007 Gold
2007/0094927 A1 5/2007 Perry
2007/0130828 A1 6/2007 Mathy
2007/0193116 A1 8/2007 Luckett et al.
2007/0261299 A1 11/2007 Kephart
2008/0168710 A1 7/2008 Mackenzie
2011/0289839 A1* 12/2011 Cronk et al. .................. 47/65.7

* cited by examiner

H1
14
22
12
16
18
20
38
38
22
22c
22b
22
22a
22b
10

60
62
64
64
67
68
70
72
72
72
72

GREEN ROOF SYSTEM WITH BIODEGRADABLE VEGETATION TRAY

FIELD

Disclosed herein are systems and apparatus related to green roof systems.

BACKGROUND

A green roof system is a system for providing vegetation growth on a roof of a building or other structure. Typical green roof systems includes a waterproof membrane applied to the surface of the roof, a layer of soil or other growing medium provided on top of the membrane, and vegetation provided in the soil. Advantages of green roof systems include lower energy costs for the building, improved roof appearance, noise reduction and increased roof life. However, typical green roof systems often require customization for each particular roof design, which can be expensive and time consuming.

Accordingly, there is a need in the art for improved green roof systems.

SUMMARY

According to one aspect of the invention, there is provided a module for covering a portion of a surface with vegetation, comprising a tray for containing a growing medium and vegetation, a permeable membrane, and a drainage board. The tray has a biodegradable bottom and a plurality of upwardly extending biodegradable walls about the perimeter of the biodegradable bottom. The biodegradable bottom is configured so that water received within the tray can pass therethrough. The permeable membrane is provided below the biodegradable bottom, and is sized and shaped so as to span the biodegradable bottom and configured to allow water to pass therethrough while inhibiting the growing medium from passing therethrough. The drainage board is provided below the permeable membrane opposite the biodegradable bottom, and has an upper surface for supporting the biodegradable bottom and being surrounded by a plurality of edges. The drainage board is configured so that at least some of the water passing through the permeable membrane and received on the drainage board will be drained away from the tray.

According to another aspect of the invention, there is provided modular system for covering a surface with vegetation, comprising a plurality of modules arranged to cover at least a portion of the surface. Each module in the system comprises a tray for containing a growing medium and vegetation, the tray having a biodegradable bottom and a plurality of upwardly extending biodegradable walls about the perimeter of the biodegradable bottom, the biodegradable bottom configured so that water received within the tray can pass therethrough; a permeable membrane provided below the biodegradable bottom, the permeable membrane sized and shaped so as to span the biodegradable bottom and configured to allow water to pass therethrough while inhibiting the growing medium from passing therethrough; and a drainage board provided below the permeable membrane opposite the biodegradable bottom, the drainage board having an upper surface for supporting the biodegradable bottom and being surrounded by a plurality of edges, the drainage board configured so that at least some of the water passing through the permeable membrane and received on the drainage board will be drained away from the tray.

BRIEF DESCRIPTION OF THE DRAWINGS

Examples will now be disclosed in particular reference to the following drawings, in which.

DETAILED DESCRIPTION

Figure 1:
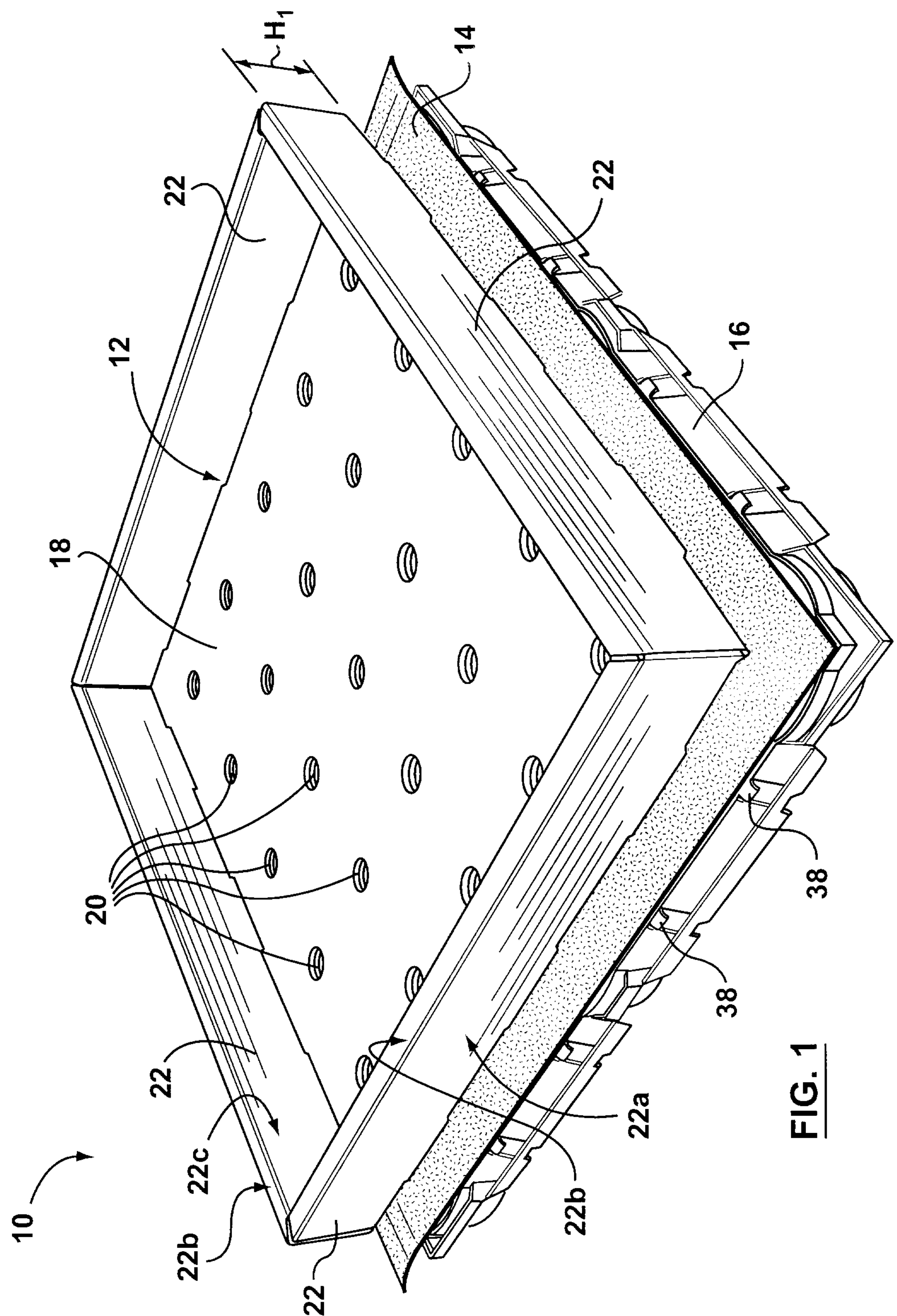
FIG. 1 is a perspective view of a module according to one embodiment of the invention.
Figure 2:
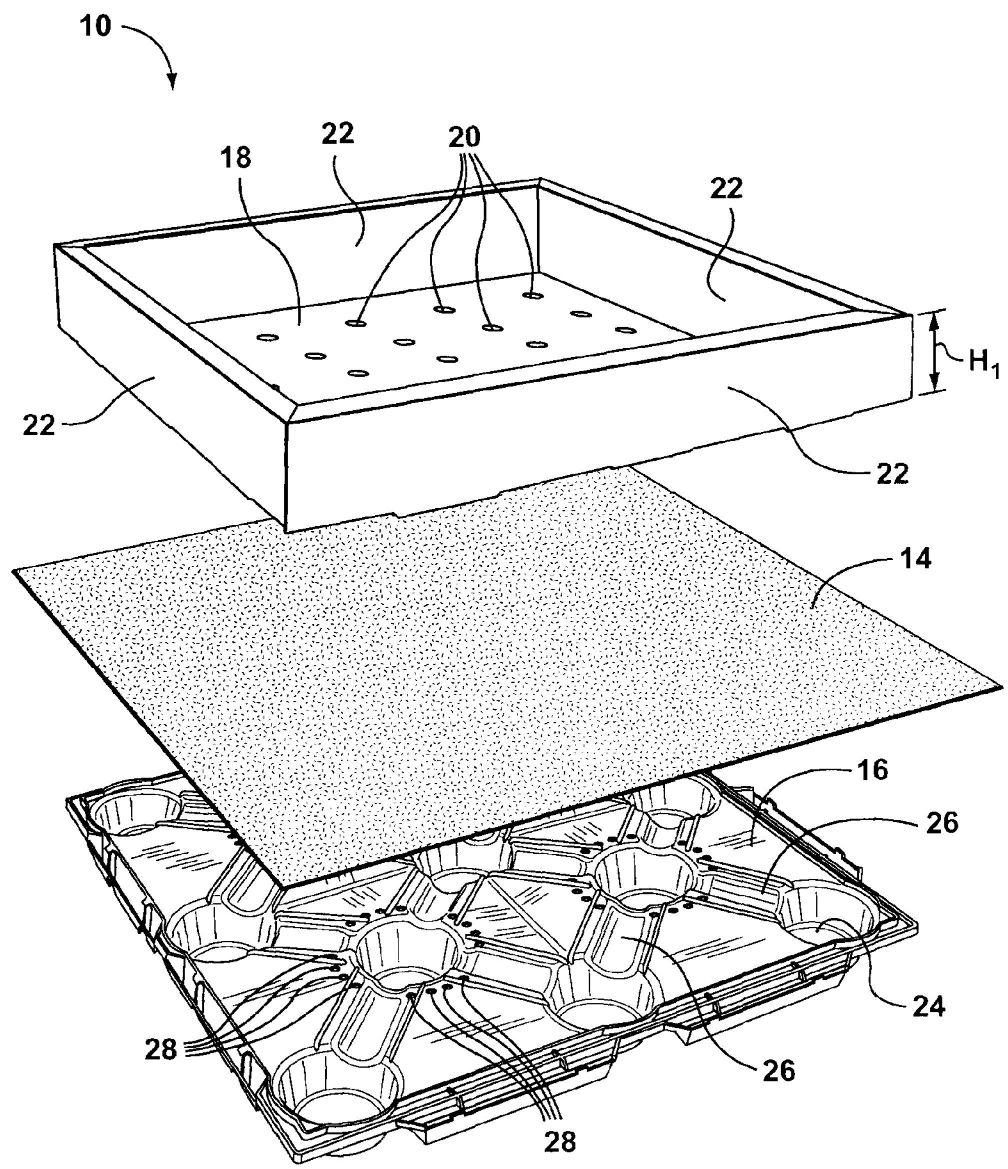
FIG. 2 is an exploded perspective view of the module of FIG. 1.

Referring generally to FIGS. 1 and 2, there is shown a module 10 for covering a portion of a surface, such as a roofing surface, with vegetation. According to one embodiment of the invention, the module 10 is a green roof module for covering a portion of a roof, which comprises a biodegradable vegetation tray 12 made of a biodegradable material, a drainage board 16 provided beneath the tray 12, and a permeable membrane provided between the tray 12 and the drainage board 16. One example of a suitable permeable membrane is a filter cloth 14, as described in this specification.

The biodegradable vegetation tray 12 is generally configured to hold soil or other growing medium and plants or other vegetation within the soil or growing medium to provide a green roof on a building or other structure. The vegetation tray 12 includes a biodegradable bottom 18 that is generally planar in shape. In some examples, the bottom 18 may have a rectangular or a square shape, or other suitable polygonal shapes that allows multiple modules to be joined together to cover a surface. As shown, for example, the bottom 18 may have a square shape with sides approximately 22.75" long.

The vegetation tray 12 may be made of various types of biodegradable material, for example a corrugated or non-corrugated cardboard, having sufficient rigidity to maintain the shape of the tray 12 when the tray 12 is filled with a growing medium and vegetation, while having biodegradation properties such that the tray 12 will last a predetermined amount of time before biodegrading.

Figure 4:
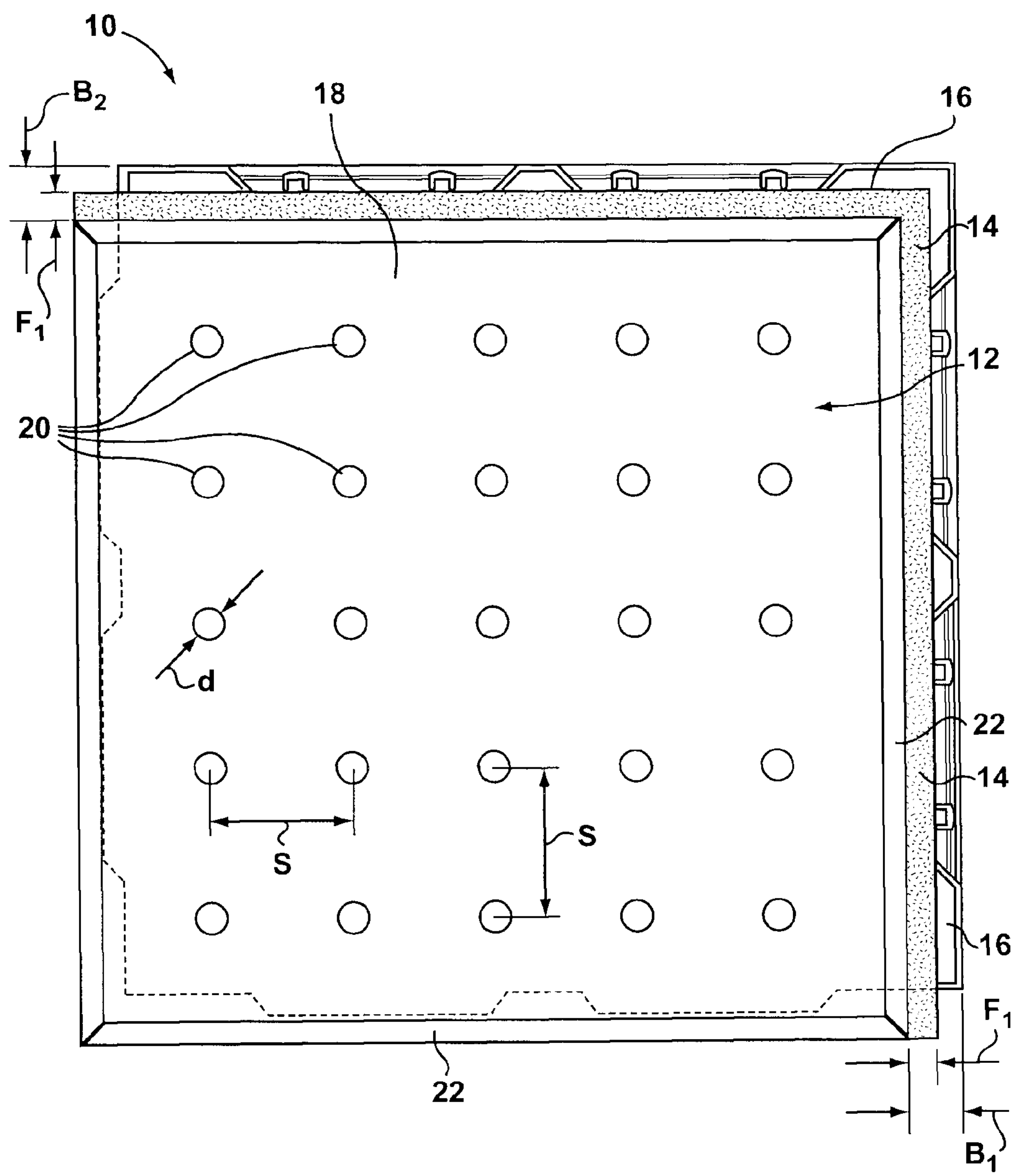
FIG. 4 is a top plan view of the module of FIG. 1.

The bottom 18 of the tray 12 has a number of drain holes 20 provided therein. The holes 20 allow excess water (e.g. rainwater, etc.) within the tray 12 to drain through the bottom 18 and into the drainage board 16, as described in greater detail below. The holes 20 may be spaced in a regular pattern or in an irregular pattern, and may be sized and located according to the drainage needs of a particular location. Where the module 10 is being used in an environment that experiences a significant amount of rain, it may be desirable to increase the number and/or the size of the holes 20 to increase drainage. Conversely, where the climate is particularly arid, it may be desirable to decrease the number and/or the size of the holes 20. As shown in FIG. 4, in some embodiments, the holes 20 may have a hole diameter D of approximately one inch, and be spaced apart by a spacing distance S that is approximately four inches.

The tray 12 also includes walls 22 that extend vertically upwardly from the bottom 18 about the perimeter of the bottom 18. The walls 22 may be made of various biodegradable materials, for example a double-walled cardboard, to provide a desired amount of strength and rate of biodegradation of the tray 12. For example, the walls 22 may be made of ¼" thick corrugated cardboard folded to form outer wall portions 22*a*, top wall portions 22*b* and inner wall portions 22*c* of the walls 22. The double-walled configuration may reduce the rate of biodegradation of the tray 12.

The walls 22 of the tray 12 have a wall height $H_1$. The wall height $H_1$ may vary according to the design of a particular module 10. For example, as shown in FIG. 1, the wall height $H_1$ may be about three inches.

The filter cloth 14, one example of a permeable membrane, is generally a thin, flexible, porous membrane that allows water to pass therethrough, but which inhibits other materials from passing therethrough. In particular, the filter cloth 14 allows water to flow through the holes 20 in the bottom 18 of the tray 12 and into the drainage board 16, but tends to inhibit soil or other growing medium, plants and other organic and non-organic materials from passing into the drainage board 16. As such, the filter cloth 14 tends to keep the drainage board 16 from becoming clogged by soil and other materials.

The drainage board 16 is configured to receive water flowing from the tray 12 and through the filter cloth 14. The drainage board 16 helps to redistribute water near the module 10, helping to control the flow of water and tending to keep the soil and other materials in the tray 12 at a desired moisture level. The drainage board 16 may also serve as a root barrier, keeping roots from the vegetation in the tray 12 away from the surface of the roof, which may prevent damage to the roof.

Figure 3:
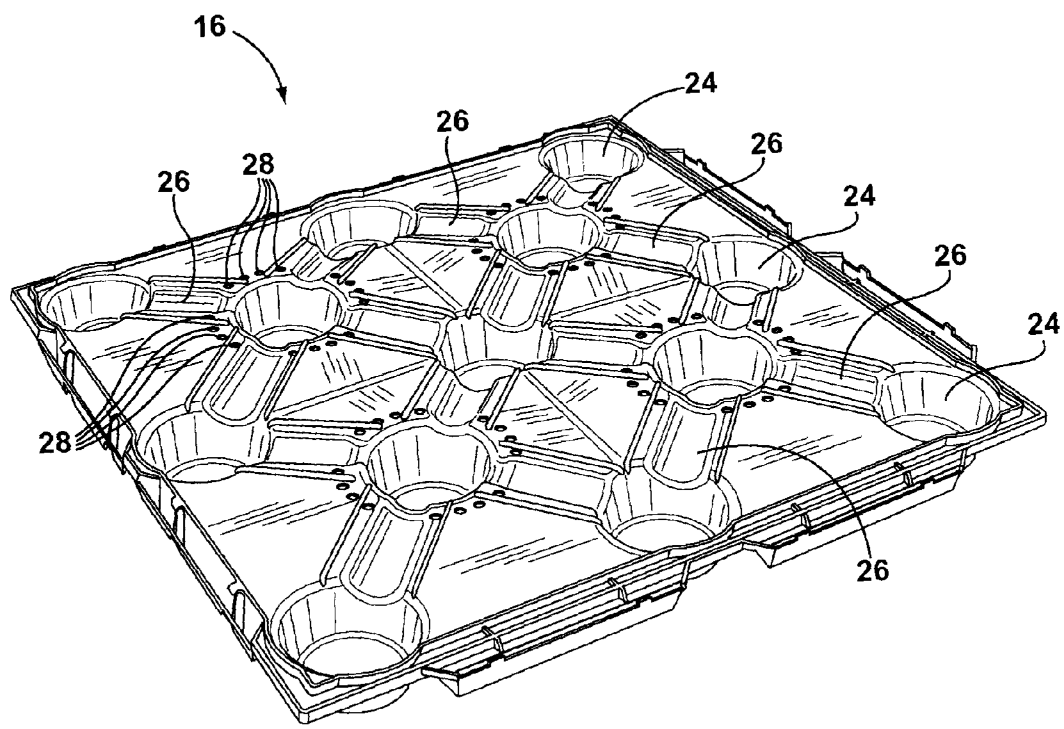
FIG. 3 is a perspective view of the drainage board of the module of FIG. 1.

As best shown in FIG. 3, the drainage board generally includes a number of pockets 24 for collecting water. The pockets 24 are connected together by fluid channels 26. When water in any particular pocket 24 exceeds the depth of the pocket 24, the water will tend to flow along the channels 26 and into other pockets 24. This tends to equalize the water distribution within the drainage board 16.

The drainage board 16 may also include overflow holes 28. If excess water is present the drainage board 16 and the water level exceeds a predetermined level, then the water will tend to flow through the overflow holes 28 and drain through the drainage board 16. This tends to inhibit the excess water from flowing back through the filter cloth 14 and into the tray 12, which could result in an overwatering condition that may be detrimental to the vegetation in the tray 12. In other embodiments, other types of suitable drainage boards may be used.

As best shown in FIG. 4, the tray 12 may be offset from one or both of the filter cloth 14 and the drainage board 16 in at least one direction. For example, the drainage board 16 and tray 12 may be offset by a first offset distance $B_1$ in a first direction and a second offset distance $B_2$ in a second direction. In some embodiments, the first and second offset distances $B_1$, $B_2$ may be equal to each other. As shown, for example, the first and second offset distances $B_1$, $B_2$ are approximately two inches.

Similarly, the tray 12 and the filter cloth 14 may be offset by a third offset distance $F_1$ and a fourth offset distance $F_2$. The first and second offset distances $B_1$, $B_2$ may be equal to each other, and may be equal or similar to the third and fourth offset distances $F_1$, $F_2$.

As described in greater detail below, the offsets allow the filter cloths 14 from adjacent modules 10 to overlap with each other. This tends to eliminate gaps between adjacent filter cloths 14 to prevent soil and other materials from passing between adjacent filter cloths 14 and into the drainage boards 16.

Figure 6:
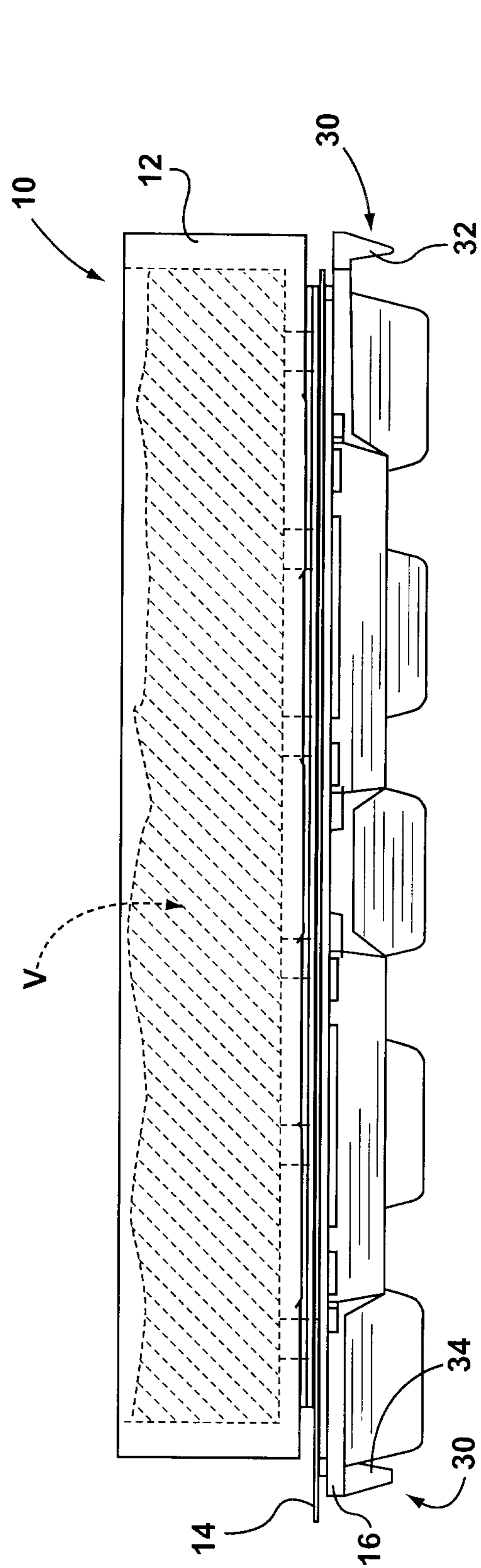
FIG. 6 is a side elevation view of the module of FIG. 1.
Figure 7:
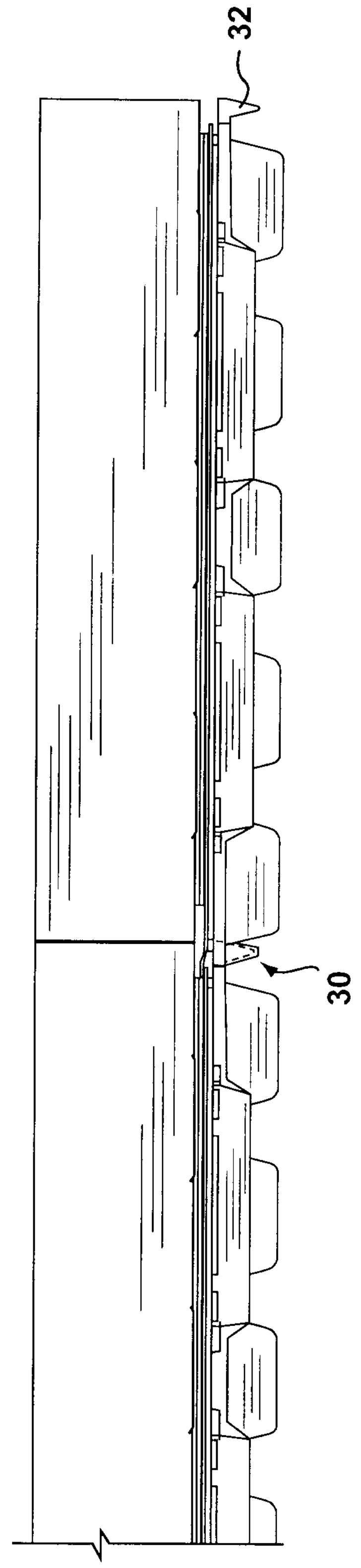
FIG. 7 is a side elevation view of two modules having drainage boards joined together by locking mechanisms.
Figure 8:
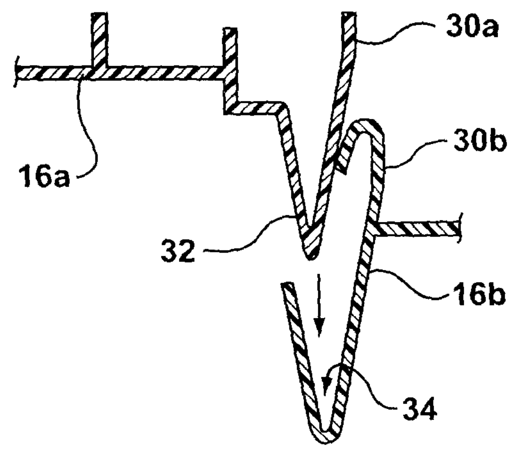
FIG. 8 is a detail view of the locking mechanisms of two drainage boards just prior to interlocking.

During use, the modules 10 may be pre-vegetated by filing the tray 12 with soil or other growing medium and plants or other vegetation (indicated generally as V in FIG. 6). The vegetation may be left to grow for a predetermined amount of time (for example, one or more growing seasons). The pre-vegetated modules 10 may then be installed on a roof or other surface (typically on top of a waterproof membrane on the roof surface). After a certain amount of time has lapsed, the vegetation tray 12 will biodegrade and the modules 10 will form an aesthetically pleasing generally seamless continuous area of vegetation.

Figure 5:
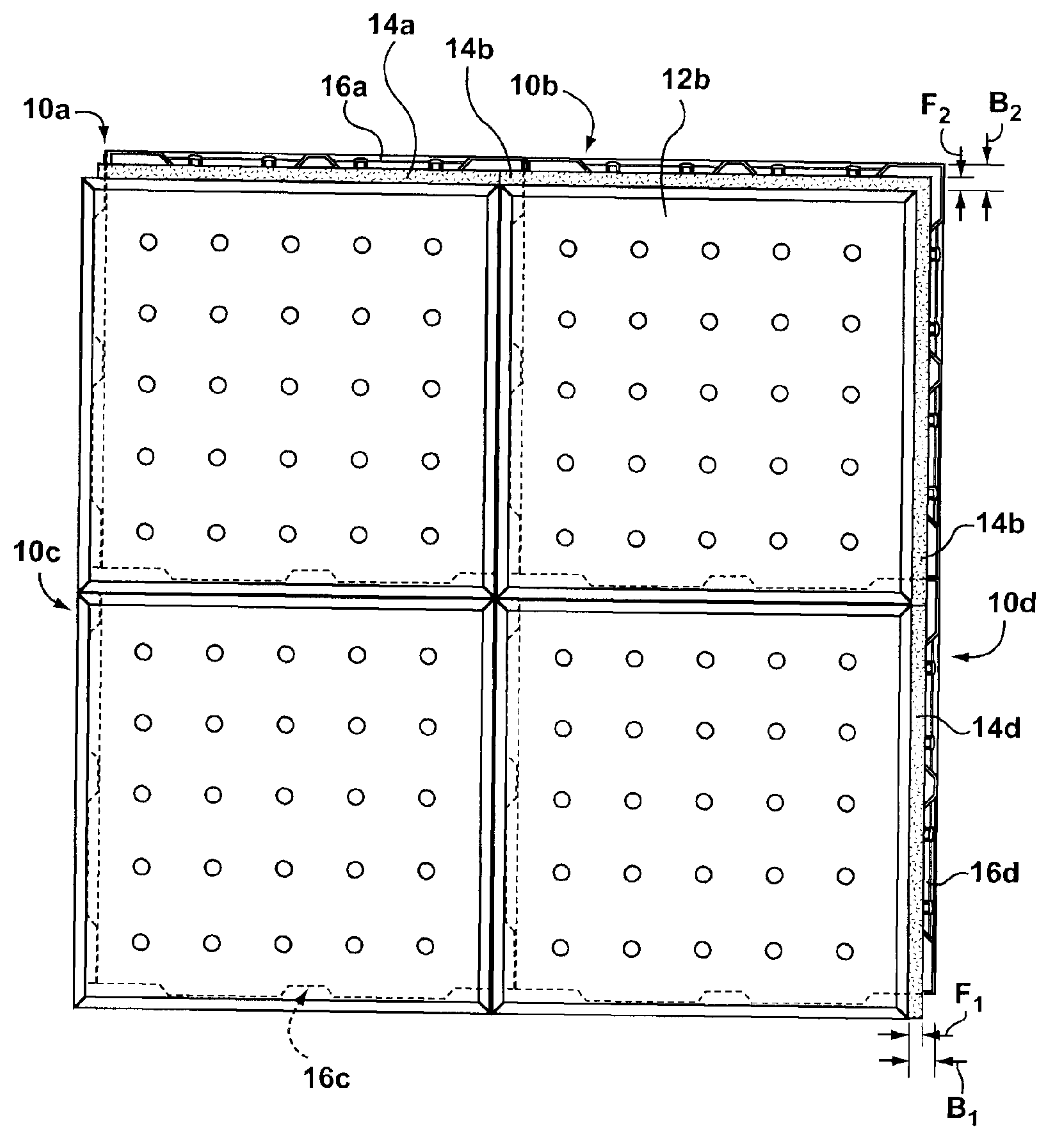
FIG. 5 is a top plan view of four modules joined together.

Multiple modules 10 may joined together to cover a surface larger than a single module 10. For example, as shown in FIG. 5, four modules 10*a*, 10*b*, 10*c*, and 10*d* may be coupled together. Due to the offset distances, $B_1$, $B_2$ $F_1$, $F_2$ between the trays 12, the filter cloths 14, and the drainage boards 16, the trays 12 and filter cloths 14 of adjacent modules 10 will overlap with each other. For example, the tray 12*b* of the module 10*b* will overlap with the drainage boards 16*a*, 16*c*, and 16*d* of the other modules 10*a*, 10*c*, 10*d*. Similarly, the filter cloth 14*b* of the module 10*b* will overlap with the filter cloths 14*a*, 14*c*, and 14*d* of the other modules 10*a*, 10*c*, 10*d*.

The overlapping of trays 12 and filter cloths 14 tends to prevent the formation of seams between filter cloths 14 in adjacent modules 10. Accordingly, the filter cloths 14 cooperate to form a generally continuous filtration membrane that spans all modules 10.

Figure 9:
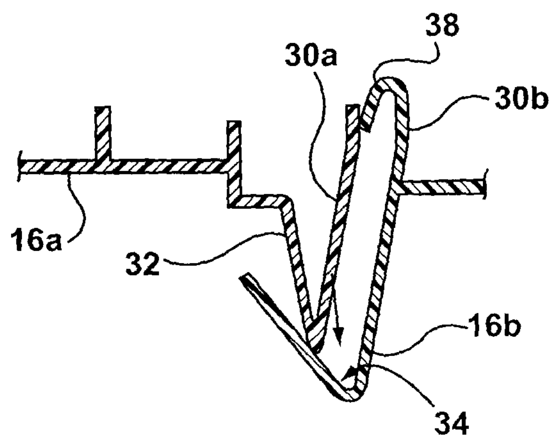
FIG. 9 is a detail view of the locking mechanisms of FIG. 8 during interlocking.
Figure 10:
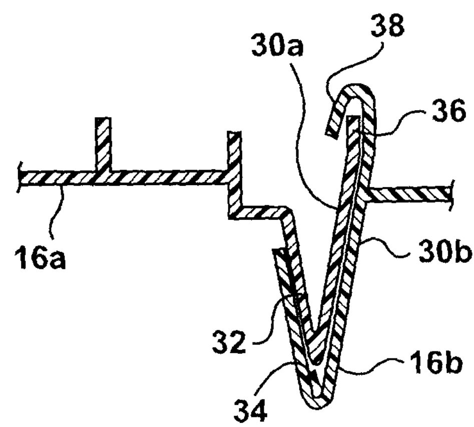
FIG. 10 is a detail view of the locking mechanisms of FIG. 8 interlocked.

As shown in FIGS. 7 to 10, the drainage boards 16 may include cooperating locking mechanisms 30 for securing adjoining modules 10 together. For example, the locking mechanisms 30 may include interlocking tab ends 32 that are received in grooves 34. To lock adjacent drainage boards 16*a*, 16*b* together, the tab ends 32 of the locking mechanism 30*a* of the first drainage board 16*a* may be received in the grooves 34 of the locking mechanism 30*b* of the second drainage board 16*b* (as shown in FIG. 9). To inhibit the locking mechanisms 30 from decoupling, an upper end 36 of the tab ends 32 may engage with locking tabs 38 located opposite the grooves 34.

In some embodiments, the tray 12 may be provided with biodegradable coating to help to control the rate of biodegrading of the tray 12. For example, a water-resistant vegetable-oil based or cornstarch-based coating may be used slow the rate of biodegradation. In other embodiments, a coating may be used to accelerate the rate of biodegradation of the tray 12. The coating may be sprayed on the tray 12 using a pump sprayer, and is preferably provided before the soil and vegetation are added to the tray 12.

The tray 12, filter cloth 14 and drainage board 16 may be fastened together using any number of suitable techniques, for example using screws, bolts or other fasteners, or adhesives such as glue.

Figure 11:
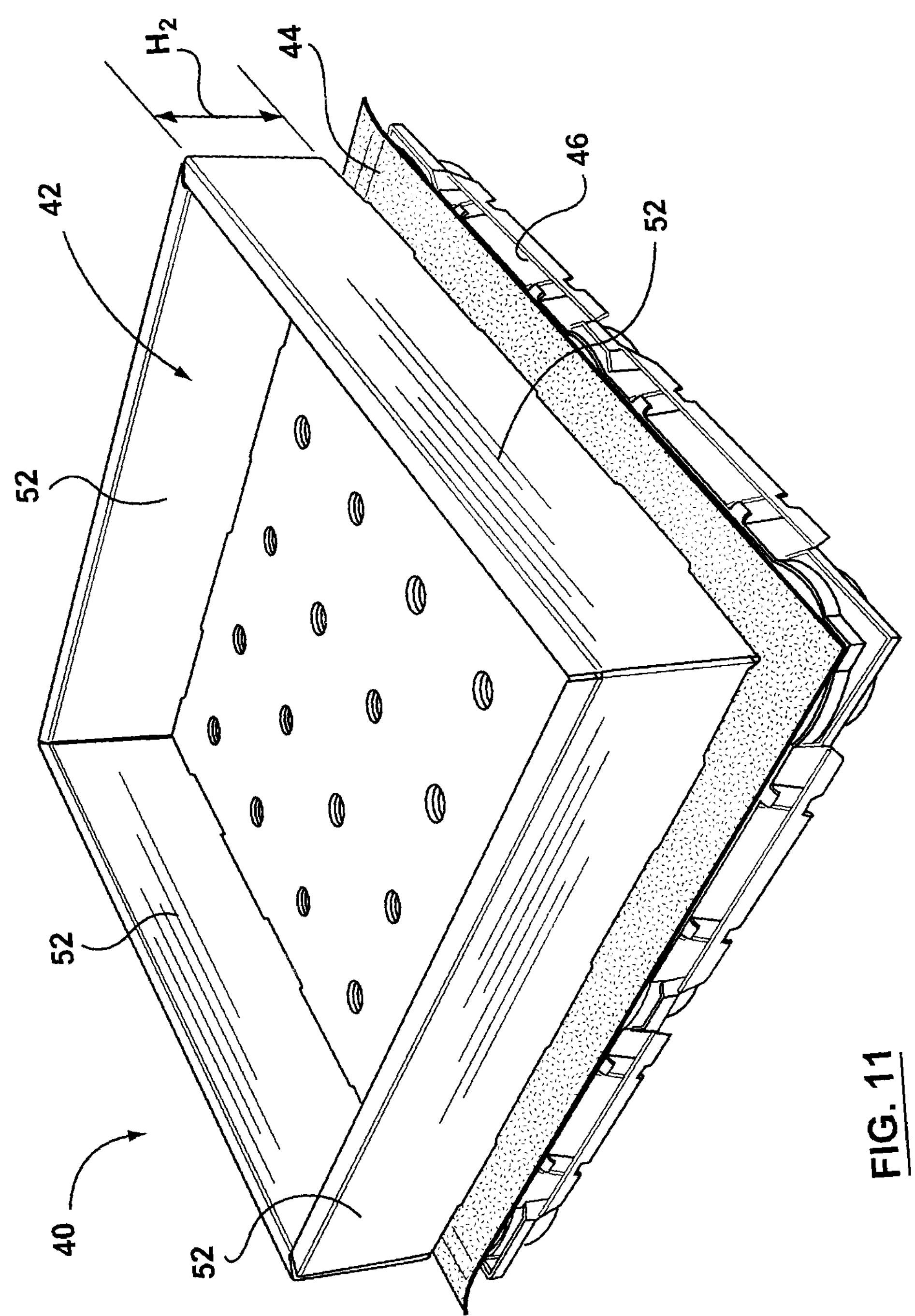
FIG. 11 is a perspective view of a module according to another embodiment of the invention.

Turning now to FIG. 11, illustrated therein is a module 40 according to another embodiment of the invention. The module 40 is generally similar to the module 10 described above, and includes a tray 42, a filter cloth 44 and a drainage board 46. However, the tray 42 of the module 40 has upstanding walls 52 that are higher than the walls 22 of the tray 10. For example, as shown the walls 52 may have a wall height $H_2$ of approximately six inches. This increased height may allow greater quantities of soil and vegetation to be provided in the tray 42.

Figure 12:
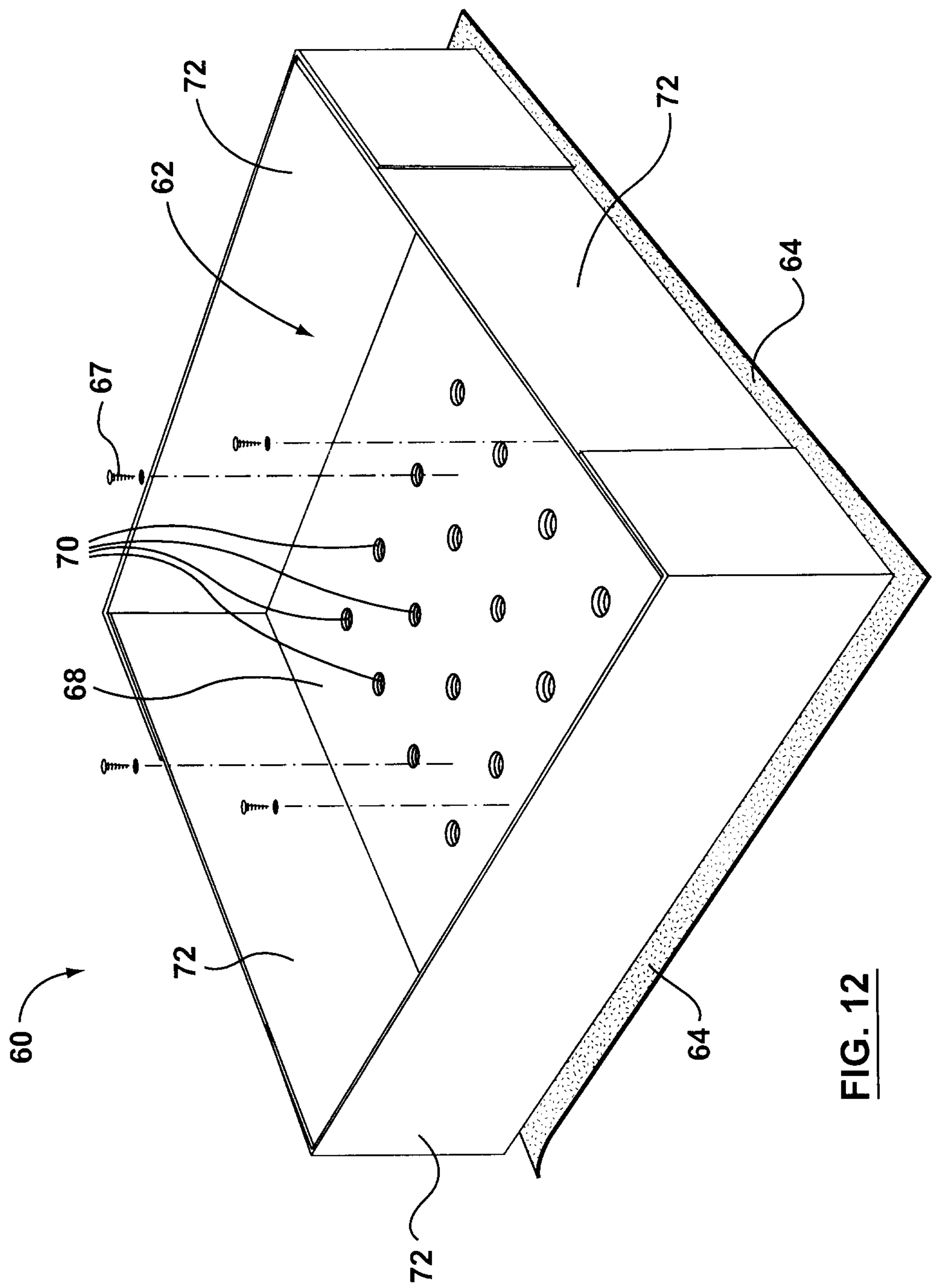
FIG. 12 is a perspective view of a module according to yet another embodiment of the invention.
Figure 13:
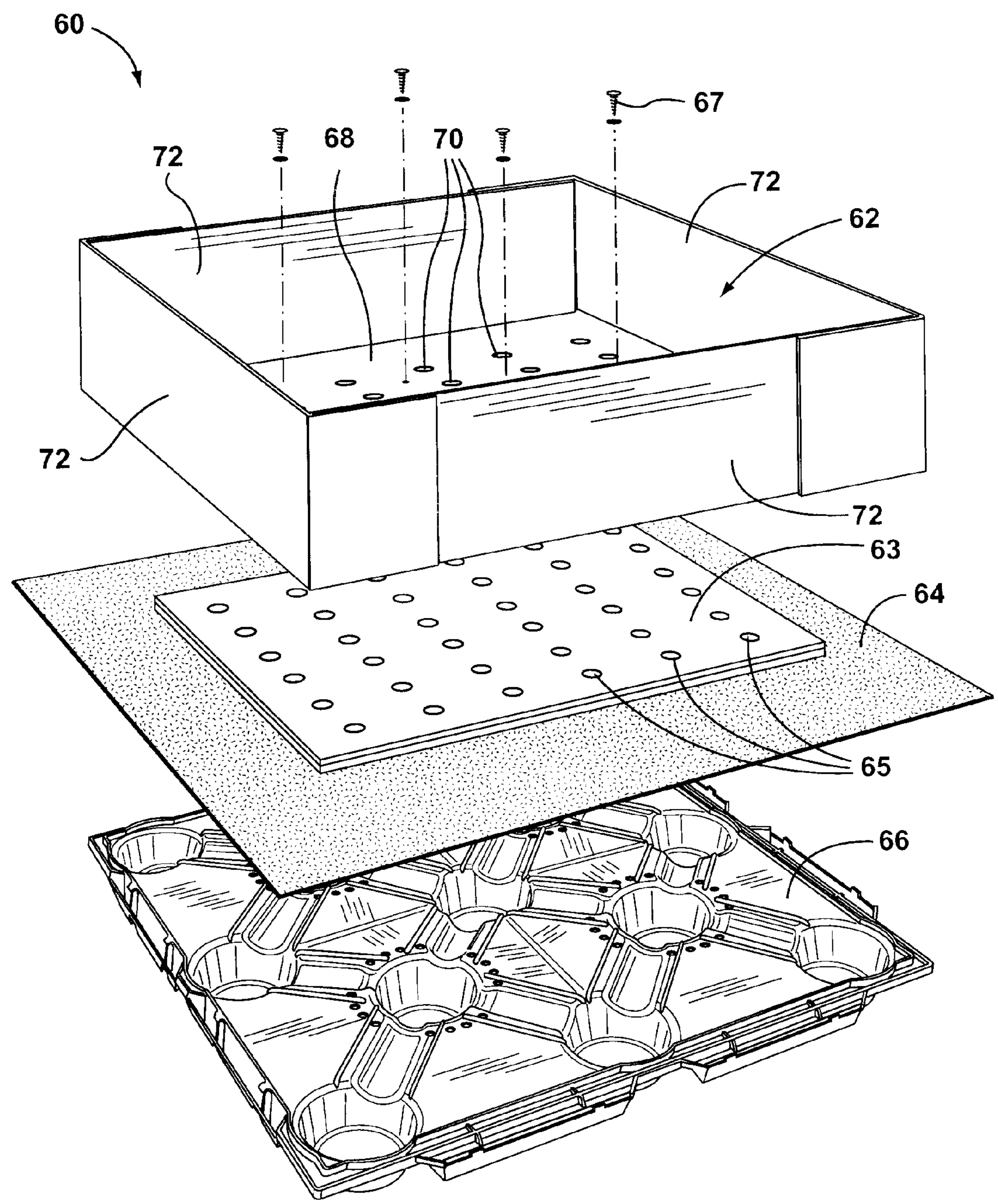
FIG. 13 is an exploded perspective view of the module of FIG. 12.
Figure 14:
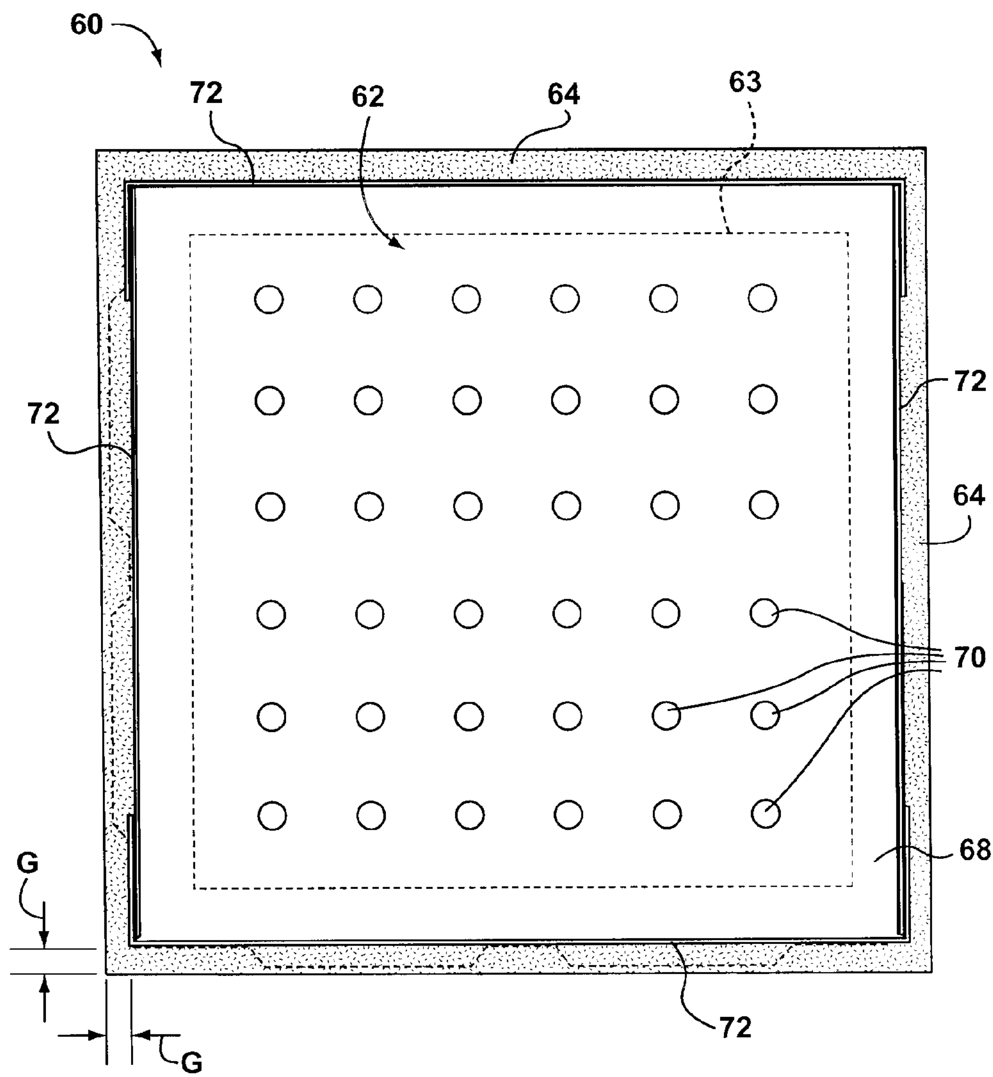
FIG. 14 is a top plan view of the module of FIG. 12.

Turning now to FIGS. 12 to 14, illustrated therein is a module 60 according to yet another embodiment of the invention. The module 60 generally includes a tray 62, a filter cloth 64 and a drainage board 66 similar to as described above.

The tray 62 includes a bottom 68 having drain holes 70 therein. The tray 62 also includes vertical walls 72 extending upwardly about the perimeter of the bottom 18. However, the walls 72 as shown are formed of a single layer of cardboard and do not include the double-walled construction as described above with respect to walls 22. Thus, the walls 72 may tend to biodegrade at a faster rate as compared to the walls 22.

As shown in FIGS. 13 and 14, the module 60 also includes a spacer 63 provided between the filter cloth 64 and the tray 62. The spacer 63 is generally sized slightly smaller than the bottom 68 of the tray 62 (as best shown in FIG. 14). This creates a recess portion between the filter cloth 64 and the tray 62 that may be used to receive the filter cloth of an adjacent module, as detailed below. The spacer 63 also includes drain holes 65 that generally align with the drain holes 70 in the bottom 68 of the tray 62, allowing water to flow through the drain holes 70 and drain holes 65 and into the drainage board 66.

In some embodiments, the tray 62, spacer 63, filter cloth 64 and drainage board 66 may be coupled together using screws 67 or other suitable fasteners.

As shown in FIG. 14, in the module 60 there is generally no offset between the tray 62 and the drainage board 66, and the filter cloth 64 generally extends beyond the width of the tray 62 by a distance G. During use of multiple modules 60, the filter cloth 64 from a particular module 10 may be tucked between the tray 62 and the filter cloth 64 of adjacent modules 60 due to the gap created by the spacer 63. In this manner, adjacent filter cloths 64 can be overlapped to provide a generally continuous filtration membrane and to eliminate seams between modules 60.

Figure 15:
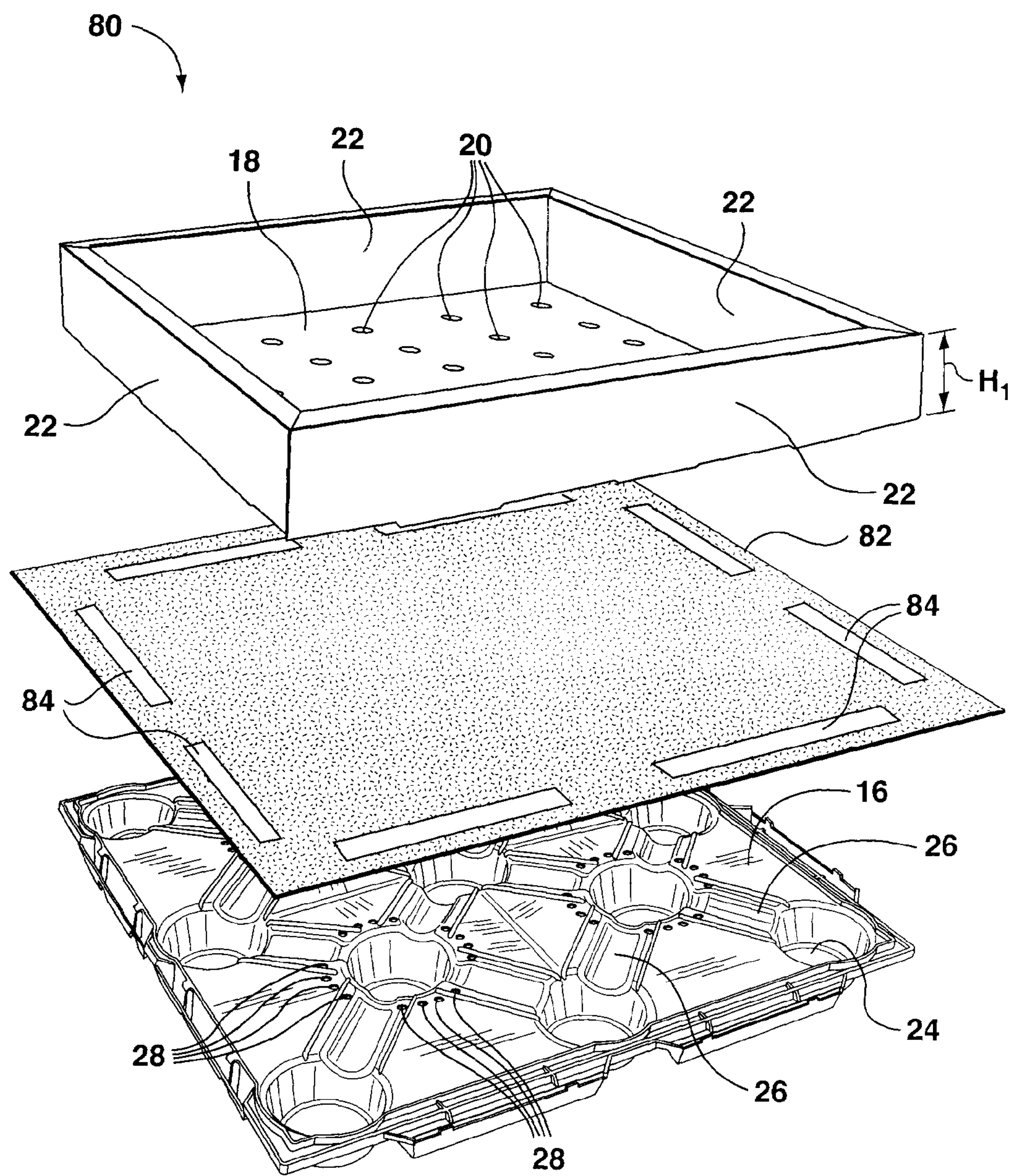
FIG. 15 is an exploded perspective view of a module according to another embodiment of the invention.

Referring now to FIG. 15, illustrated therein is a module 80 according to another embodiment of the invention, comprising a filter cloth 82 having one or more cutouts 84 spaced around the edges of the filter cloth 82. Preferably, the filter cloth 82 comprises one cutout 84 corresponding to each coupling member on the drainage board 16, for example locking mechanism 30. As shown, each cutout 84 may be aligned with its corresponding coupling member or locking mechanism and may be sized and shaped to receive the tab ends 32 of locking mechanism 30 of an adjacent module 80 when the modules are locked together and installed on a roof. If a module 80 is connected to multiple other modules (i.e. each side of the module is attached to an adjacent module) then the filter cloth 82 of the module 80 may comprise several cutouts 84, as shown.

Having a plurality of cutouts 84 that can be engaged by the tab ends 32 of adjacent module locking mechanisms 30 enables the filer cloth 82 of a given module 80 to be secured in place when the module 80 is connected to adjacent modules. When the tab end 32 of a locking mechanism 30 is inserted through a cutout 84 and then received in the groove 34, a portion of the filter cloth 82 may become trapped or retained within the locking mechanism 30. As a result, the edges of the filter cloth 82 may be pinned down, or trapped between the edges of adjoining modules 10. Trapping or retaining the edges of the filter cloth 82 of first module 80 may enable a user to more easily overlap the filter cloth 82 with the extending portion of the filter cloth 82 of a second, connected module. Having a portion of the filter cloths 82 retained between the modules 80 may also prevent bunching of the filter cloths 82 and may enable a user to create a more uniform, continuous filtration membrane that has fewer bumps and gaps between neighboring filter cloths 82.

In this description, the subject module has been described and illustrated as a green roof module adapted to cover a portion of the upper roofing surface of a building with vegetation. However, it should be understood that the subject module could also be used to cover a portion of other generally horizontal or angled surfaces that form part of a building or other structure, including patios, terraces, porches, verandas, decks, trusses and ledges.

While the above description includes a number of exemplary embodiments, changes and modifications may be made to such embodiments without departing from the present invention, the scope of which is defined in the appended claims.

The invention claimed is:

1. A module for covering a portion of a surface with vegetation, comprising:

(a) tray for containing a growing medium and vegetation, the tray having a biodegradable bottom and a plurality of upwardly extending biodegradable walls about the perimeter of the biodegradable bottom, the biodegradable bottom configured so that water received within the tray can pass therethrough;

(b) a permeable membrane provided below the biodegradable bottom, the permeable membrane sized and shaped so as to span the biodegradable bottom and configured to allow water to pass therethrough while inhibiting the growing medium from passing therethrough; and (c) a drainage board provided below the permeable membrane opposite the biodegradable bottom, the drainage board having an upper surface for supporting the biodegradable bottom and being surrounded by a plurality of edges, the drainage board configured so that at least some of the water passing through the permeable membrane and received on the drainage board will be drained away from the tray.

2. The module of claim 1, wherein the biodegradable bottom includes a plurality of drain holes for allowing water to pass therethrough.

3. The module of claim 1, wherein at least one edge of the drainage board has at least one coupling member, each coupling member configured to engage with another coupling member on another module.

4. The module of claim 1, wherein the permeable membrane is flexible.

5. The module of claim 1, wherein the permeable membrane comprises a filter cloth.

6. The module of claim 1, wherein the permeable membrane extends beyond at least one edge of the drainage board.

7. The module of claim 6, wherein the permeable membrane extends beyond the at least one edge of the drainage board by a distance selected so that when the module is connected to another module, the permeable membrane of the module overlaps at least a portion of a permeable membrane of the other module to deter the growing medium from passing between the permeable membranes.

8. The module of claim 1, wherein the permeable membrane is offset from the drainage board so that the permeable membrane covers the upper surface of the drainage board and extends beyond only some of the plurality of edges of the drainage board.

9. The module of claim 6, wherein the permeable membrane extends beyond at least two edges of the drainage board.

10. The module of claim 1, further comprising a spacer located between the permeable membrane and the biodegradable bottom for spacing the biodegradable bottom of the tray away from the upper surface of the drainage board.

11. The module of claim 10, wherein the spacer is smaller than the biodegradable bottom such that the edges of the spacer are offset from the edges of the biodegradable bottom.

12. The module of claim 10, wherein the spacer is biodegradable.

13. The module of claim 10, wherein the biodegradable bottom of the tray comprises a first plurality of drain holes and the spacer comprises a second plurality of drain holes, the first and second plurality of holes cooperating to allow water to drain from the tray.

14. The module of claim 13, wherein the second plurality of drain holes in the spacer correspond to, and are aligned with, at least a portion of the first plurality of drain holes in the bottom of the tray.

15. The module of claim 10, wherein the upper surface of drainage board, the biodegradable bottom of the tray and an edge of the spacer cooperate to define a gap, the gap having a height that is greater than a thickness of the permeable membrane and being configured to receive at least a portion of a permeable membrane of another module.

16. The module of claim 3, wherein the permeable membrane comprises at least one cutout aligned with each coupling member, each cutout sized and shaped to receive at least a portion of a coupling member of another module.

17. The module of claim 16, wherein, when the module is coupled to another roof coupling module, a portion of the permeable membrane is retained between the coupling member of the module and the coupling member of the other module received in the cutout in the permeable membrane.

18. The module of claim 1, wherein the drainage board is substantially impermeable to roots of vegetation within the tray, so that the drainage board forms a root barrier.

19. The module of claim 1, wherein the plurality of upwardly extending walls are integral with the bottom of the tray.

20. The module of claim 1, wherein the tray is formed from cardboard.

21. The module of claim 1, wherein the walls of the tray have a double-wall configuration comprising an outer wall portion, a top wall portion and an inner wall portion.

22. The module of claim 1, wherein the tray is at least partially treated with a biodegradable coating so that treated portions of the tray biodegrade at a different rate than non-treated portions of the tray.

23. The module of claim 1, wherein the drainage board further comprises at least one pocket for retaining water.

24. The module of claim 23, wherein the drainage board comprises a plurality of pockets for retaining water.

25. The module of 24, wherein at least two of the plurality of pockets are in fluid communication with each other so that water can flow therebetween.

26. The module of claim 1, wherein the drainage board further comprises a plurality of overflow holes extending through the drainage board configured to enable excess water to pass through the drainage water.

27. A modular system for covering a surface with vegetation, the system comprising:

(a) a plurality of modules arranged to cover at least a portion of the surface;

(b) each module in the system comprising:

(i) a tray for containing a growing medium and vegetation, the tray having a biodegradable bottom and a plurality of upwardly extending biodegradable walls about the perimeter of the biodegradable bottom, the biodegradable bottom configured so that water received within the tray can pass therethrough;

(ii) a permeable membrane provided below the biodegradable bottom, the permeable membrane sized and shaped so as to span the biodegradable bottom and configured to allow water to pass therethrough while inhibiting the growing medium from passing therethrough; and (iii) a drainage board provided below the permeable membrane opposite the biodegradable bottom, the drainage board having an upper surface for supporting the biodegradable bottom and being surrounded by a plurality of edges, the drainage board configured so that at least some of the water passing through the permeable membrane and received on the drainage board will be drained away from the tray.

28. The modular system of claim 27, wherein each biodegradable bottom comprises a plurality of drain holes for allowing water to pass therethrough.

29. The modular system of claim 27, wherein the permeable membrane is a filter cloth.

30. The modular system of claim 27, wherein at least one edge of each drainage board comprises at least one coupling member for coupling a first module to at least one second, adjacent module.

31. The modular system of claim 30, wherein the permeable membrane of a first module extends beyond at least one edge of the drainage board of the first module by a distance selected so that when the first module is connected to each second module, the permeable membrane of the first module overlaps at least a portion of a permeable membrane of each second module to deter the growing medium from passing between the permeable membranes.

32. The modular system of claim 31, wherein the permeable membranes of each module cooperate to form a generally continuous filtration membrane that spans all of the modules arranged on the roof.

33. The modular system of claim 27, wherein each module further comprises a spacer located between the permeable membrane and the biodegradable bottom for spacing the biodegradable bottom of the tray away from the upper surface of the drainage board.

34. The modular system of claim 33, wherein the spacer is smaller than the biodegradable bottom such that the edges of the spacer are offset from the edges of the biodegradable bottom.

35. The modular system of claim 33, wherein the spacer is biodegradable.

36. The modular system of claim 33, wherein each biodegradable bottom of the tray comprises a first plurality of drain holes and each spacer comprises a second plurality of drain holes, the first and second plurality of holes cooperating to allow water to drain from the tray.

37. The modular system of claim 36, wherein the second plurality of drain holes in each spacer correspond to, and are aligned with, at least a portion of the first plurality of drain holes in each biodegradable bottom of the tray.

38. The modular system of claim 33, wherein the upper surface of drainage board, the biodegradable bottom of the tray and an edge of the spacer of a first module cooperate to define a gap, the gap having a height that is greater than a thickness of the permeable membrane and being configured to receive at least a portion of a permeable membrane of a second module.

39. The modular system of claim 27, wherein the plurality of upwardly extending walls are integral the bottom of the tray.

40. The modular system of claim 27, wherein the tray is formed from cardboard.

41. The modular system of claim 27, wherein the walls of the tray have a double-wall configuration comprising an outer wall portion, a top wall portion and an inner wall portion.

42. The modular system of claim 27, wherein a plurality of modules arranged on the roof define a plurality of gaps between facing edges of adjacent drainage boards, each gap is covered by the permeable membrane of at least one module.

43. The modular system of claim 27, wherein the permeable membrane of a first module comprises at least one cutout aligned with each coupling member on the first module, each cutout sized and shaped to receive at least a portion of a second coupling member of a second module.

44. The modular system of claim 43, wherein, when the first module is coupled to the second module, a portion of the first permeable membrane is retained between the coupling member of the first module and the coupling member of the second module received in the cutout in the permeable membrane.

45. A module for covering a portion of a surface with vegetation, comprising:

(a) a biodegradable tray for containing a growing medium and vegetation, the biodegradable tray having a plurality of upwardly extending biodegradable walls, the biodegradable tray being configured so that water received within the tray can pass therethrough;

(b) a permeable membrane provided below the biodegradable tray, the permeable membrane sized and shaped so as to span the biodegradable tray and configured to allow water to pass therethrough while inhibiting the growing medium from passing therethrough; and (c) a drainage board provided below the permeable membrane opposite the biodegradable tray, the drainage board having an upper surface for supporting the biodegradable tray and being surrounded by a plurality of edges, the drainage board configured so that at least some of the water passing through the permeable membrane and received on the drainage board will be drained away from the tray.

46. The module of claim 45, wherein the biodegradable tray has a bottom portion configured so that water received within the tray can pass therethrough.

47. The module of claim 46, wherein the bottom portion has at least one drain hole for allowing water to pass through the bottom portion and to the drainage board.

48. A modular system for covering a surface with vegetation, the system comprising:

(a) a plurality of modules arranged to cover at least a portion of the surface;

(b) each module in the system comprising:

(i) a biodegradable tray for containing a growing medium and vegetation, the biodegradable tray having a plurality of upwardly extending biodegradable walls, the biodegradable tray being configured so that water received within the tray can pass therethrough;

(ii) a permeable membrane provided below the biodegradable tray, the permeable membrane sized and shaped so as to span the biodegradable tray and configured to allow water to pass therethrough while inhibiting the growing medium from passing therethrough; and (iii) a drainage board provided below the permeable membrane opposite the biodegradable tray, the drainage board having an upper surface for supporting the biodegradable tray and being surrounded by a plurality of edges, the drainage board configured so that at least some of the water passing through the permeable membrane and received on the drainage board will be drained away from the tray.

49. The modular system of claim 48, wherein each biodegradable tray has a bottom portion configured so that water received within the tray can pass therethrough.

50. The modular system of claim 49, wherein the bottom portion has at least one drain hole for allowing water to pass through the bottom portion and to the drainage board.

* * * * *